(12) United States Patent
Telep et al.

(10) Patent No.: US 8,084,913 B2
(45) Date of Patent: Dec. 27, 2011

(54) DC MOTOR WITH ASYMMETRICAL POLES

(75) Inventors: Robert J. Telep, Livonia, MI (US); Robert D. Keefover, Lake Orion, MI (US)

(73) Assignee: BorgWarner Inc., Auburn Hills, MI (US)

( * ) Notice: Subject to any disclaimer, the term of this patent is extended or adjusted under 35 U.S.C. 154(b) by 1098 days.

(21) Appl. No.: 11/245,340

(22) Filed: Oct. 6, 2005

(65) Prior Publication Data
US 2007/0080599 A1    Apr. 12, 2007

(51) Int. Cl.
*H02K 1/00*    (2006.01)
(52) U.S. Cl. ... 310/216.096; 310/216.018; 310/216.111; 310/216.097
(58) Field of Classification Search ........... 310/216.096, 310/216.097, 216.111, 216.018
See application file for complete search history.

(56) References Cited

U.S. PATENT DOCUMENTS

| | | | | |
|---|---|---|---|---|
| 4,554,491 A * | 11/1985 | Plunkett | ......... | 318/254 |
| 4,700,098 A * | 10/1987 | Kawashima | ......... | 310/186 |
| 5,880,551 A * | 3/1999 | Prudham | ......... | 310/254 |
| 6,043,574 A * | 3/2000 | Prudham | ......... | 310/49 R |
| 6,486,576 B1 * | 11/2002 | Yura et al. | ......... | 310/49 R |
| 6,720,686 B1 * | 4/2004 | Horst | ......... | 310/51 |
| 6,791,223 B2 * | 9/2004 | Suzuki et al. | ......... | 310/156.43 |
| 2002/0093265 A1 | 7/2002 | Nelson | | |
| 2005/0264120 A1 * | 12/2005 | Hiruma et al. | ......... | 310/156.44 |

FOREIGN PATENT DOCUMENTS

| | | |
|---|---|---|
| EP | 0 343 681 A2 | 11/1989 |
| EP | 1 143 600 A1 | 10/2001 |
| FR | 2 754 953 A1 | 4/1998 |
| FR | 2 843 501 A1 | 2/2004 |
| JP | 59053078 | 3/1984 |
| JP | 02269459 | 11/1990 |
| JP | 04248358 | 9/1992 |
| JP | 04248359 | 9/1992 |
| WO | WO 97/23943 | 7/1997 |

\* cited by examiner

*Primary Examiner* — Quyen Leung
*Assistant Examiner* — Naishadh Desai
(74) *Attorney, Agent, or Firm* — Warn Partners, P.C.

(57) ABSTRACT

The present invention relates to a motor having a stator with a magnetized rotor rotatably positioned in the stator. The stator and the rotor each have at least two magnetic poles. At least one of the stator poles has a different area confronting the poles of the rotor than the other stator poles. An air gap is positioned between each of the at least two stator poles and at least two rotor poles. The distance of the air gap between each stator pole and each rotor pole is different. A coil is wound upon a bobbin which is placed about at least one of the stator poles. Altering the confronting area of the stator poles allows a larger bobbin and coil to be placed about the stator pole.

16 Claims, 5 Drawing Sheets

US 8,084,913 B2

DC MOTOR WITH ASYMMETRICAL POLES

FIELD OF THE INVENTION

The present invention is directed brushless DC motors having modified stator poles.

BACKGROUND OF THE INVENTION

Electric motors are used in numerous applications, including, but not limited to applications in which the desired action is to position components in response to a command signal. The devices for these applications are classified as electrical actuators that may incorporate some form of mechanical advantage, such as gear reduction, to multiply the motor torque. In addition, a return spring is often used to position the actuator to a default position when no current is applied. These actuators typically use a DC motor with permanent magnets, either on the rotating or stationary member, to provide a magnetic field which the current carrying windings of the motor can react to produce useful torque and motion.

Motors have several characteristics that effect their operation. A first characteristic is the amount of conductor material (usually copper) that can physically be used for a given motor size. Typically a motor will have several regions of conductor material wound about a stator. In general increased winding mass decreases the electrical heating loss and the motor can deliver greater torque. The second factor in defining the motor operation is non-energized or detent torque. This is the amount of torque required to rotate the motor without current. This torque is caused by the interaction between the magnetic force of the individual magnetic poles of the rotor with the magnetic poles of the stator as a function of angular position. A low detent torque will minimize the electromagnetic motor torque required to rotate the motor. In practical applications this could allow a return spring torque to be reduced which would increase useful torque and minimize motor heating.

FIG. 1 is a cross-sectional plan view of a motor 10 as known in the prior art. The motor 10 has a stator 12 that contains the portion of the motor 10 that is actuated. Within the stator 12 is a movable rotor 14 that rotates within the stator 12. The rotor 14 has poles 16 spaced along its outside circumference. The stator 12 functions to interact with the poles 16 on the rotor 14. As shown in FIG. 1 there are three coil center poles 20 with alternating outside winding poles 22. An air gap 26 is positioned between each coil center pole 20 and the poles 16 of the rotor 14 and each outside winding pole 22 and the poles 16 of the rotor 14. The coil center poles 20 are configured to receive a bobbin 21 having an electromagnetic coil 23 wound upon the bobbin 21. The bobbin 21 is configured to slide over and surround each center coil pole 20. Each outside winding pole has a tooth 24 that functions to balance the magnetic forces generated by the coil center poles 20. The problem with this design is that the tooth 24 inhibits the width of the bobbin 21 and electromagnetic coil 23 that can be placed about the coil center poles 20. Therefore it is desirable to have a motor design that will allow for a wider bobbin 21 and coil 23 to be used.

SUMMARY OF THE INVENTION

The present invention relates to a motor having a stator with a magnetized rotor rotatably positioned in the stator. The stator and the rotor each have at least two magnetic poles. At least one of the stator poles has a different width and area confronting the poles of the rotor than the other stator poles. An air gap is positioned between each of the at least two stator poles and at least two rotor poles. The distance of the air gap between each stator pole and each rotor pole is different. A coil is wound upon a bobbin which is placed about at least one of the stator poles. Altering the confronting area of the stator poles allows a wider bobbin and coil to be placed about the stator pole.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 2:
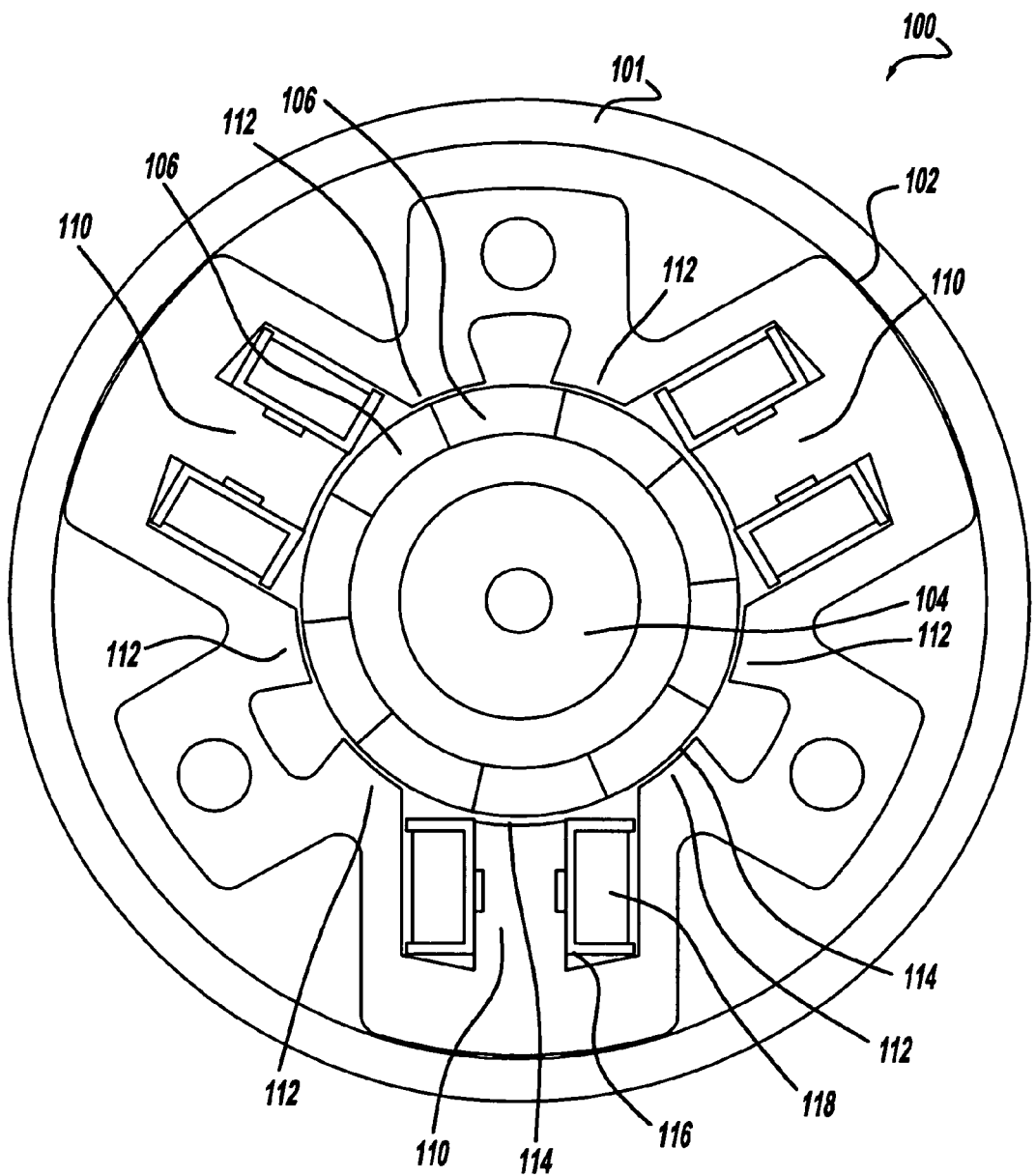
FIG. 2 is a cross-sectional plan view of an electromagnetic motor in accordance with the invention.

FIG. 2 depicts an embodiment of the invention showing a motor 100. The motor 100 has a motor housing 101 containing a motor stator 102 that contains a rotatable magnetized rotor 104. The magnetized rotor 104 has five pole pairs 106 configured around the outside surface of the magnetized rotor 104. The pole pairs 106 are arranged in an alternating fashion so that a north pole is adjacent to a south pole. However it is within the scope of this invention to have a fewer number of pole pairs and/or a different configuration of the north and south poles. Additionally it is also possible for the amount of surface areas of each pole to be different. For example, it is possible for the south pole to be wider than the north pole, or vice-versa.

The stator 102 is configured to interact with the pole pairs 106 of the magnetized rotor 104 as the rotor 104 rotates. As shown in FIG. 2 the stator 102 has three coil center poles 110 with six outside winding poles 112. The outside winding poles 112 and coil center poles 110 are arranged in an alternating fashion. The coil center poles 110 are positioned equidistantly around the circumference of the magnetized rotor 104. The pole pairs 106 are positioned directly adjacent or adjacent to the coil center poles 110 and outside winding poles 112. Between the pole pairs 106 of the magnetized rotor 104 and each individual coil center pole 110 and each individual outside winding pole 112 is an air gap 114.

Figure 1:
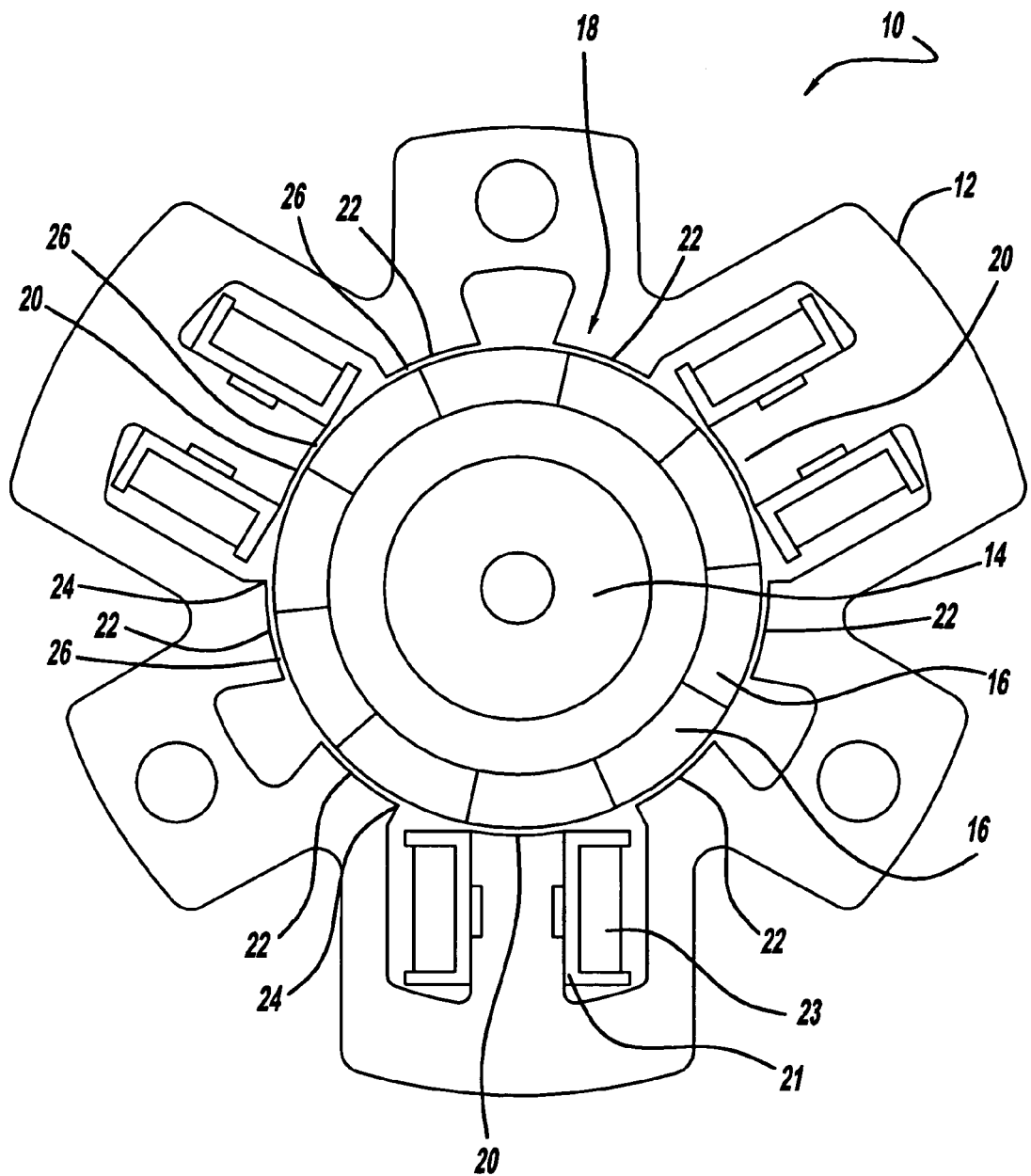
FIG. 1 is a cross-sectional plan view of a prior art electromagnetic motor.

A bobbin 116 with an electromagnetic coil 118 wound about the bobbin 116 is placed around each coil center pole 110. This particular embodiment of the invention does not have a tooth 24 (shown in FIG. 1), therefore, the electromagnetic coil 118 wound about the bobbin 116 can be wider since there is more clearance for placing the bobbin 116 and electromagnetic coil 118 about the coil center pole 110.

Figure 3:
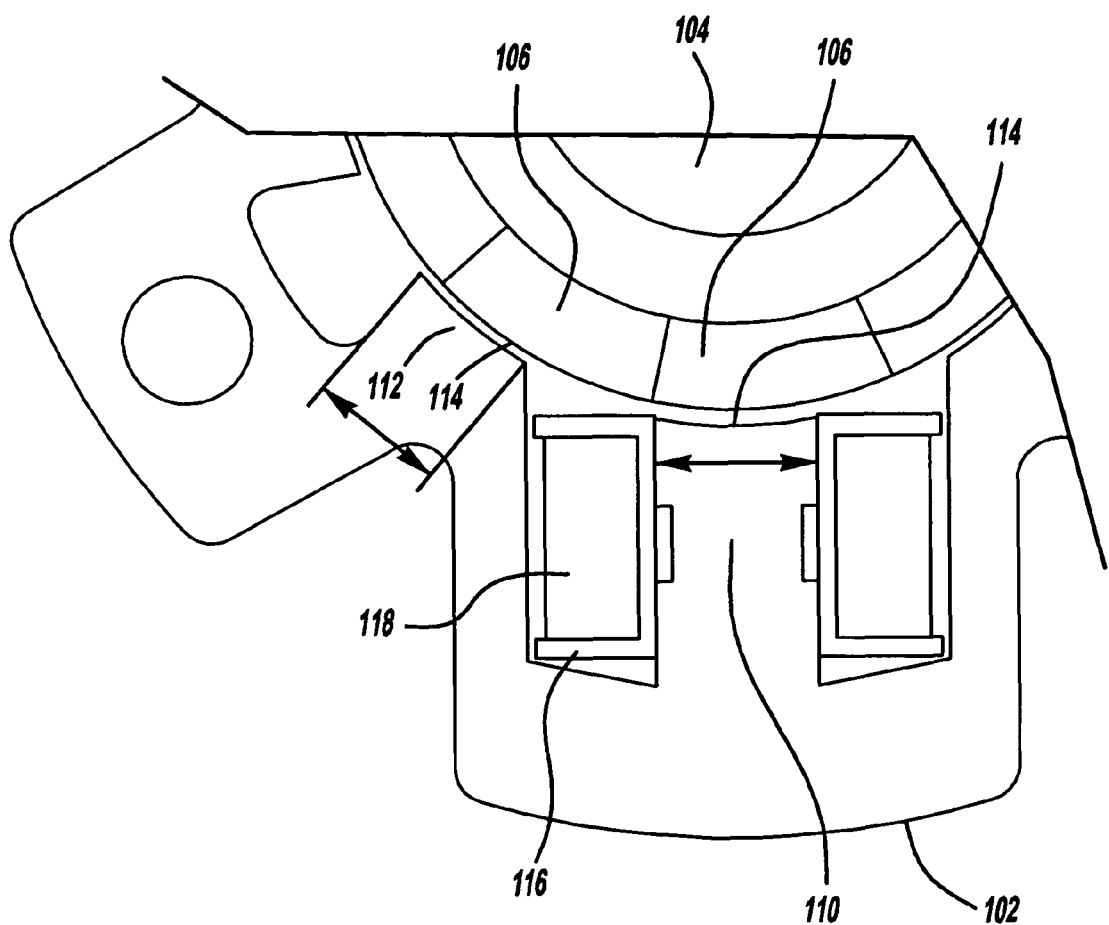
FIG. 3 is a close up of the coil center pole and outside winding poles of the stator in accordance with the invention as shown in FIG. 2.

Accommodating a wider electromagnetic coil 118 is possible by altering the configuration of the stator 102. FIG. 3 shows an exploded view of the coil center pole 110 and one outside winding pole 112. There is difference between the width of the coil center pole 110 and the outside winding pole 112 thus allowing for a wider electromagnetic coil to be incorporated, however, the difference in width between the two poles unbalances the magnetic forces of the outside winding poles 112 and the coil center pole 110. The unbalanced magnetic forces can be controlled by adjusting the air gap 114 at the coil center pole 110 and the air gap 114 at the outside winding pole 112. In example as shown in FIG. 3 the outside winding pole 112 has a lesser width than the coil center pole 110, thus the air gap 114 between each respective poles are different. This also alters the magnetic forces, and when done properly will balance the magnetic force for each respective coil center pole 110 and outside winding pole 112.

Another configuration for controlling detent torque of the rotor 104 is accomplished by adjusting the surface area or arrangement of the pole pairs 106. Thus it is also possible for each individual pole to have a different surface area. For example, the north pole may have a greater surface area than the south pole to create the detent torque.

The present invention provides the advantage of minimizing the amount of space taken up by the motor stator. Additionally using a larger electromagnetic coil 118 will increase motor torque and/or minimize motor heat and wear that will be encountered during motor operation.

Figure 4:
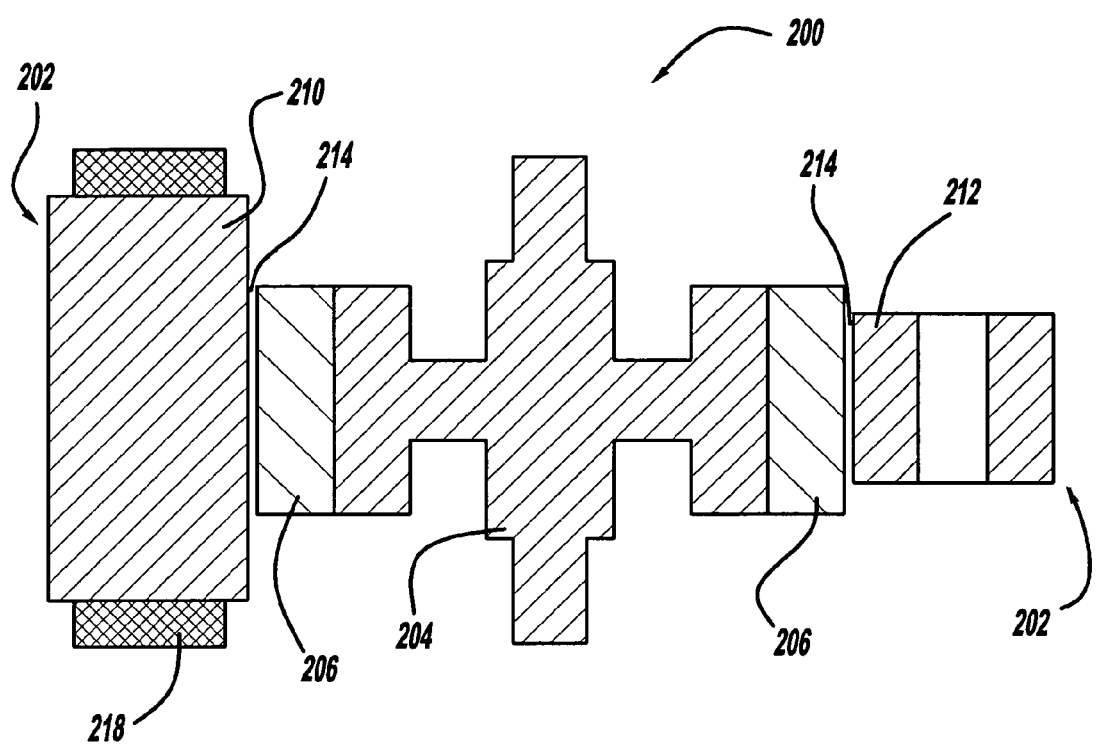
FIG. 4 is a plan side view of an alternate embodiment of the invention.

Referring to FIG. 4 an alternate embodiment of the invention is shown. A motor 200 is depicted as having a stator 202 with a rotor 204 rotatably disposed within the stator 202. The rotor 204 has magnetic pole pairs 206 rotatably disposed on the rotor 204. The stator 202 has a coil center pole 210 and outside winding pole 212. It is within the scope of this embodiment to have a lesser or greater number of stator or rotor poles than what is shown in FIG. 4. An air gap 214 is positioned between the pole pairs 206 of the rotor 204 and the poles 210, 212 of the stator 202.

The present embodiment differs from the other embodiments in that the width of the coil center poles 210 and outside winding poles 212 are not wider, but rather they are different in height such that the coil center pole 210 is higher than the outside winding pole 212. Thus, the overall height of the stator pole 210 is longer as opposed to wider as depicted in the previous embodiments. This allows for the same confronting area between the stator poles 210, 212 and the poles 206 of the rotor 204 to be achieved as would be found in the previous embodiment. However, the present embodiment provides the advantage of making the stator pole 210 longer as opposed to thicker while still allowing for a larger electromagnetic coil 218 to be wound about the coil center pole 210.

The description of the invention was for a motor having a wound coil on the stator; however, it is also within the scope of this invention to be applied to a motor having a coil located on the rotor. Such motors use a method to apply electric drive to the rotor mounted coil. One such method would be the use of brushes and a commutator.

Figure 5:
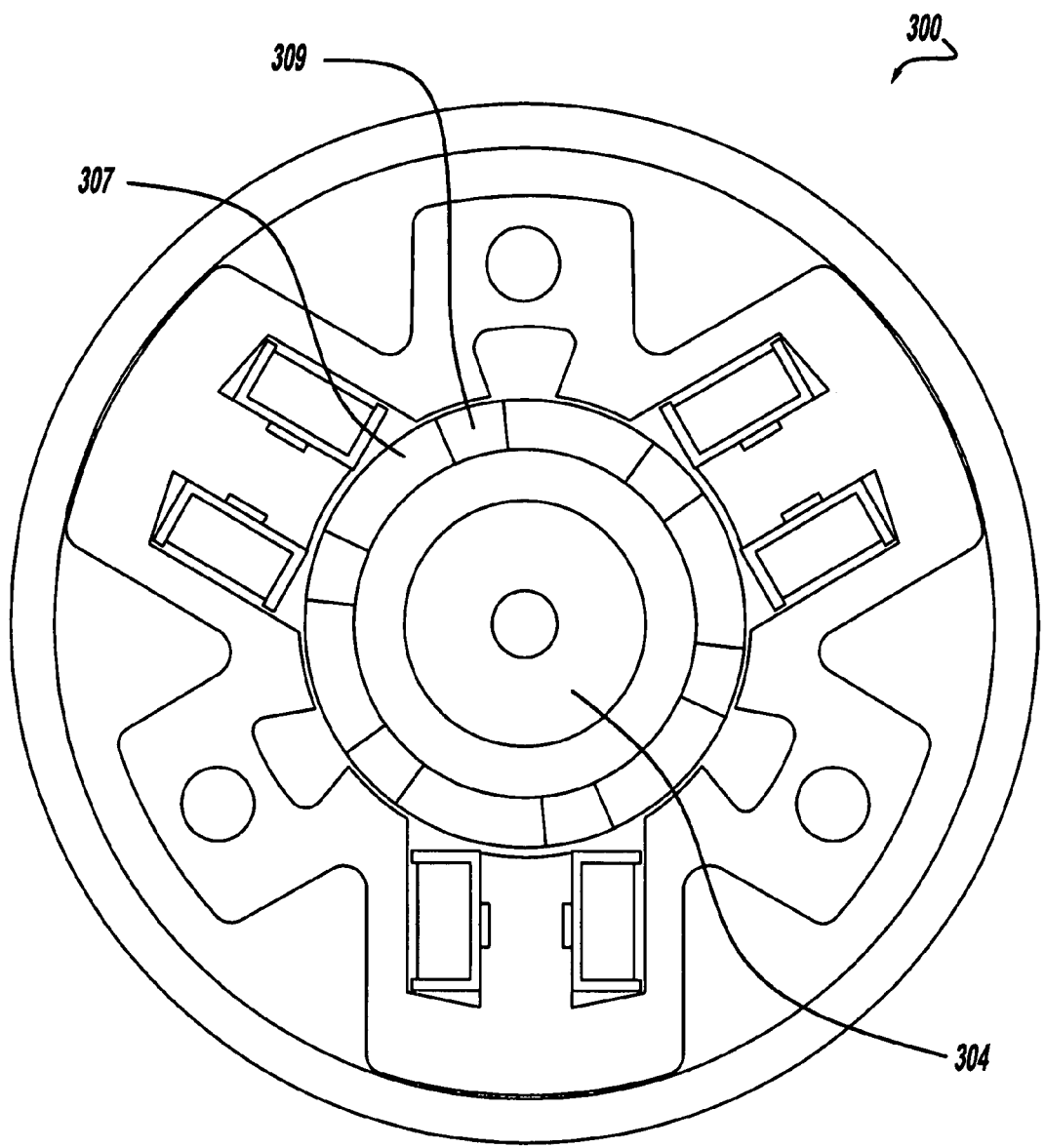
FIG. 5 is a cross sectional plan view of an electrical magnetic motor in accordance with an alternate embodiment of the invention.

FIG. 5 shows an alternate embodiment of the invention wherein a motor 300 has a rotor 304 with two or more rotor poles that include at least one north pole 307 and at least one south pole 309. This particular embodiment of the invention shows the north poles 307 having a different rotor surface area than the rotor surface area of the south poles 309.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A motor comprising:
   a stator having at least two magnetic stator poles;
   a rotor rotatably disposed in said stator wherein said rotor has at least two magnetic rotor poles, wherein said at least two stator poles each have a different confronting area defined in part by the height of the stator poles, compared to said confronting area defined in part by the height of said at least two rotor poles;
   an air gap between each said at least two rotor poles and said at least two stator poles; wherein the distance of said air gap between each said at least two stator poles and said at least two rotor poles is different; and
   a coil surrounding said at least one of said at least two stator poles.

2. The motor of claim 1 wherein the distance of said air gap is dependent upon the difference in confronting area of one of said stator poles and all other stator poles.

3. The motor of claim 1 wherein the width of said coil is dependent upon the width of the stator pole adjacent said coil.

4. The motor of claim 1, wherein each said at least two rotor poles have at least one north pole and at least one south pole, wherein a rotor surface area of said at least one north pole is different than the rotor surface area of said at least one south pole.

5. A motor comprising:
   a housing;
   a magnetized rotor rotatably disposed in said housing wherein said rotor has at least one pair of opposing poles;
   a stator formed in said housing having at least one coil center pole and at least two outside winding poles;
   a coil wound on a bobbin, wherein said coil and said bobbin surround said at least one coil center; and
   an air gap between each said coil center pole and said magnetized rotor and each said outside winding pole and said magnetized rotor, wherein the size of said air gap is dependent upon the difference in area between coil center pole and one said outside winding pole.

6. The motor of claim 5, wherein the width of each said at least one center pole is larger than the area of each said at least two outside winding poles.

7. The motor of claim 6, wherein the width of said coil wound on said bobbin is dependent upon the area of said outside winding pole.

8. The motor of claim 5, wherein each said pole pairs have a north pole and a south pole, wherein a rotor surface area of said north pole is different than the rotor surface area of said south pole.

9. The motor of claim 5 wherein the size of said air gap is dependent upon the area of said at least one coil center pole and the area of said at least two stator poles.

10. The motor of claim 9 wherein said at least one coil center pole and said at least two stator poles are different heights.

11. A motor comprising:
    a motor stator;
    a magnetized rotor rotatably disposed in said stator wherein said rotor has at least one pair of opposing poles;
    a stator having three coil center poles and six outside winding poles wherein said coil center poles are positioned around the circumference of said rotor and the distance between each said coil center pole about the circumference of said rotor is equal, two said outside winding poles formed in the stator between each said coil center pole, wherein the width of each said coil center pole is larger than the width of each said outside winding poles; and an air gap between each said coil center pole and said magnetized rotor and each said outside winding pole and magnetized rotor.

12. The motor of claim 11 wherein the size of said air gap between said rotor and each said coil center pole and said rotor and each said outside winding pole is dependent upon the difference in width of one of said coil center poles and one of said outside winding poles.

13. The motor of claim 11, wherein the width of said coil wound on said bobbin is dependent upon the width of each said outside winding pole.

14. The motor of claim 11, wherein said magnetized rotor has 5 pole pairs disposed around said rotor in an alternating fashion.

15. The motor of claim 14 wherein each said pole pairs have a north pole and a south pole having an equal surface areas.

16. The motor of claim 14 wherein each said pole pairs have a north and a south pole, wherein a rotor surface area of said north pole is different from the rotor surface area of said south pole.

* * * * *

UNITED STATES PATENT AND TRADEMARK OFFICE
CERTIFICATE OF CORRECTION

| | |
|---|---|
| PATENT NO. | : 8,084,913 B2 |
| APPLICATION NO. | : 11/245340 |
| DATED | : December 27, 2011 |
| INVENTOR(S) | : Robert J. Telep et al. |

It is certified that error appears in the above-identified patent and that said Letters Patent is hereby corrected as shown below:

Column 1,
Line 5, "directed brushless" should be -- directed to brushless --.

Column 2,
Line 25, "FIG. 2.;'" should be -- FIG. 2; --.

Column 2,
Line 27, "invention." should be -- invention; and --.

Column 3,
Line 6, "There is difference" should be -- There is a difference --.

Column 3,
Line 14, "In" should be -- An --.

Column 3,
Line 16, "are" should be -- is --.

Column 5,
Line 3, Claim 11, "equal," should be -- equal; --.

Column 6,
Line 8, Claim 15, "having an equal" should be -- having equal --.

Signed and Sealed this
Twenty-seventh Day of November, 2012

David J. Kappos
*Director of the United States Patent and Trademark Office*